Patented Dec. 28, 1948

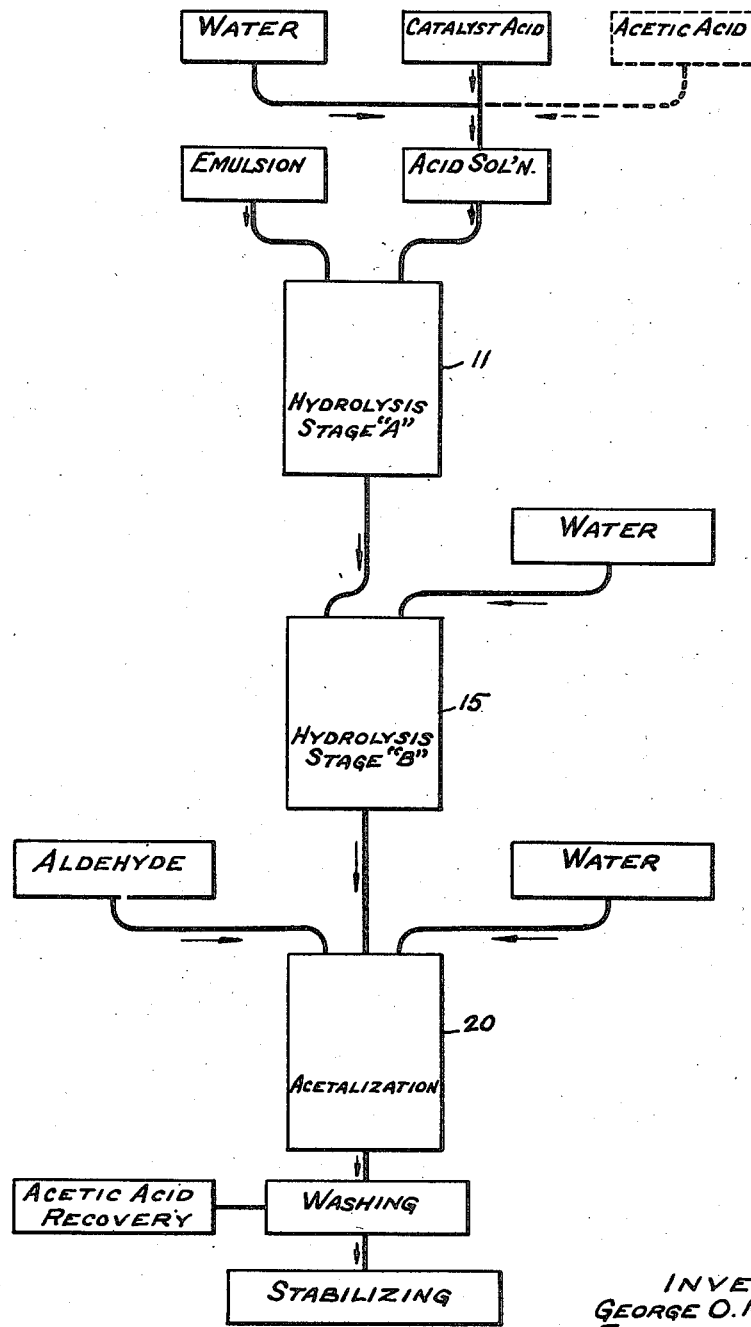

2,457,261

UNITED STATES PATENT OFFICE 2,457,261

POLYVINYL ACETAL RESINS

George Osman Morrison, Frederick Pettit Lossing, Albert Harold Heatley, and Joseph Frederic Leo Marcel Germain, Shawinigan Falls, Quebec, Canada, assignors to Shawinigan Chemicals Limited, Montreal, Quebec, Canada, a corporation of Canada Application May 16, 1945, Serial No. 594,060
In Canada August 19, 1944

1 Claim. (Cl. 260—73)

This invention relates to the manufacture of polyvinyl acetal resins.

THE PRIOR ART

Polyvinyl acetal resins are produced commercially by polymerizing a vinyl ester, partially or completely hydrolyzing the polymer, and reacting the hydrolysis product with one or more aldehydes in the presence of a mineral acid catalyst and sufficient solvent to produce a homogeneous solution of the polyvinyl acetal formed and optionally neutralizing the mineral acid catalyst, separating and purifying the polyvinyl acetal, and if desired, stabilizing it. The intermediate products may or may not be separated during the procedure. The hydrolysis and acetalization steps may be carried out sequentially, semi-sequentially, or simultaneously, in the presence of sufficient solvent to dissolve the acetal resin and to produce a homogeneous solution at the end of the acetalization step.

The separation of the polyvinyl acetal resin from the solution may be accomplished by precipitation with water or by steam distillation. The former has been preferred since the resin is obtained in the form of particles which can be washed with water and stabilized, whereas with the latter method, the resin is obtained in lump form making the washing and stabilization difficult.

The necessity for employing solvents to attain homogeneous conditions has been a definite and serious disadvantage in the production of polyvinyl acetal reins. The solvents in most general use such as the lower aliphatic alcohols or esters, or mixtures thereof, for instance, methyl or ethyl compounds, combine with some of the organic acid produced during hydrolysis and are solvents or latent solvents for the polyvinyl acetal resins produced. They thus help to create homogeneous conditions at least towards the conclusion of the acetal reaction, but have the disadvantage of requiring to be used in large quantities and of necessitating relatively complicated separation and solvent recovery equipment, thus adding materially to the cost. The use as solvent of the organic acid corresponding to the vinyl ester being hydrolyzed results in the simplification of the solvent recovery system, since there is only involved the recovery of the organic acid and its separation from unreacted aldehyde. However, in most cases, where an organic acid is used as solvent, low-colour resins are difficult to obtain.

It has also been proposed to prepare a polyvinyl acetal resin by adding an aldehyde to a water solution of polyvinyl alcohol at a temperature below 50° C. in the presence of an acid catalyst and a dispersing agent, and agitating to cause an intermediate polyvinyl acetal resin to be precipitated in finely divided form, and continuing the agitation and heating until the reaction mixture has proceeded to the desired end point. This process has the disadvantage of introducing into the reaction mixture foreign substances, most of which are detrimental.

Moreover, all these disclosures fail to recognize certain factors which, we have discovered, play an important part in making polyvinyl acetals by aqueous methods.

OBJECTS

It is, therefore, a principal object of the present invention to provide an improved process of preparing polyvinyl acetal resins. It is a further object of the invention to provide a process in which the foreign substances present are reduced to a minimum. It is a still further object of the invention to provide a process which does not require the addition of extraneous solvents.

THE INVENTION

With these and other objects in mind, our invention provides for the preparation, in the complete absence of extraneous solvents, of polyvinyl acetal resins, including those of crystal grade. The invention, in its several phases, involves novel steps and novel combinations of steps.

For instance, in making a polyvinyl acetal by one of our preferred methods, we start by preparing an emulsion of polyvinyl acetate by polymerization in emulsion with a partially hydrolyzed polyvinyl acetate as the emulsifying agent. The emulsion is diluted with water, and acetic acid and sulphuric acid, also diluted with water are added with slow stirring. The mixture is mildly heated, while continuously stirring, until the characteristic white colour of the emulsion disappears and the mixture becomes almost transparent. At this stage, sufficient water is added to achieve the desired degree of hydrolysis, and the reaction is allowed to continue to equilibrium, which depends upon the relative proportions of acetic acid, water, and the hydrolysis product of polyvinyl acetate. The addition of some acetic acid in the initial steps of hydrolysis greatly speeds up the reaction. This acetic acid may be added as such or in solution with water, or may be that present in a portion of the product from a previous hydrolysis run.

The thick solution of partially hydrolyzed polyvinyl acetate obtained is transferred to a vessel equipped for high speed agitation. The solution is desirably diluted with water to a point where the total solids range from about 3% to about 6.5%, to reduce it to a consistency where it can be readily filtered to remove dirt. The diluted solution is then cooled to a temperature from about 0° C. to about 15° C. More sulphuric acid may be added, if required, and butyraldehyde is mixed in, while stirring, the temperature meanwhile being kept at from about 0° C. to about 15° C. After a time, the acetal resin precipitates in very fine particles, which require violent agitation to prevent sticking. After the acetalization has proceeded sufficiently to avoid the danger of the particles sticking, the temperature may be, and is preferably raised to the range from about 25° C. to about 65° C. and stirring is continued at this higher temperature until the product has reached the desired composition, and the fine particles have agglomerated to form porous grains.

The product is then easily washed, preferably by drawing off part of the liquid through a filter and adding fresh water. Then partial separation is preferably carried out once or twice more, whereupon it is possible to drain the resin completely without the particles sticking together, and to finish washing with water, draining completely after each washing. The washed resin is then easily stabilized by treating it with an aqueous solution of sodium or potassium hydroxide at an elevated temperature. The resin is separated by filtration, washed once with water, and dried at a moderate temperature.

The hydrolysis and acetalization steps described are preferably carried out as a cyclic process illustrated in the single figure of the drawing. In operating according to this process, in the first cycle, emulsion and an acid solution made up of water, sulphuric acid, and acetic acid, are added to a vessel 11 in which the "A" stage of hydrolysis is carried out. This charge is reacted for a time at a moderate temperature. Part of the solution, preferably about one-half to about two-thirds of the solution, is removed to a vessel 15 wherein it is diluted with water and allowed to hydrolyze further ("B" stage) to the desired degree. The solution of hydrolysis product thus formed is then acetalized and the resultant polyvinyl acetal resin is washed and stabilized. The acetic acid in the acetalization charge is recovered at the washing step. To the remainder of the solution in vessel 11, containing acetic acid generated during the previous hydrolysis, is added fresh emulsion and catalyst acid solution, and the hydrolysis is carried out as before. The cycle may be repeated indefinitely. The vessels 11 and 15 are equipped for slow stirring, and the vessel 20 is equipped for vigorous stirring.

VARIATIONS

It will, of course, be understood that the process as outlined and consequently the nature of the product are susceptible to variation through a wide range by changes in one or more factors, among the most important of which are the following.

(a) The viscosity of the polyvinyl acetate (b) The extent of hydrolysis of the polyvinyl acetate (c) The amount and character of the aldehyde or aldehydes which are reacted with the hydrolysis product (d) The amount and character of the acid catalyst (e) The temperatures at which the reaction is carried out (f) The amount and character of the caustic alkali used for stabilization.

EXAMPLES

In order that these variations may be more completely understood and that the carrying out of the invention may be fully within the knowledge of those skilled in the art, examples will now be given dealing with the preparation of representative polyvinyl acetal resins, according to preferred procedures developed by the applicants. It will, of course, be understood that the data given are illustrative only and should not be considered as limiting to the scope of the invention.

EXAMPLE 1

*Preparation of polyvinyl butyral*

A polyvinyl acetate aqueous emulsion containing 55% solids was prepared by the method disclosed in copending application No. 465,260, now Patent No. 2,398,344 in which there was used as an emulsifying agent 3% by weight of the total charge of a partial hydrolysis product of polyvinyl acetate containing 20% acetate groups and made from a polyvinyl acetate having a viscosity of 15 centipoises. The polymer in the emulsion had a viscosity of 57 centipoises (1 molar in benzene at 20° C.). 1000 parts of this emulsion were heated to 70° C. while stirring slowly, and a mixture consisting of 125 parts of water, 131 parts of F. P. (British Pharmacopoeia) grade acetic acid, and 110 parts of c. p. sulphuric acid was added during one hour. The opaque mixture was stirred slowly at 70° C. until it became transparent. This occurred four hours after the addition of the water, acetic acid, and sulphuric acid. 2000 parts of water were then added during one hour. The reaction was allowed to continue for a further period of 8 hours at 70° C. with stirring, at the end of which time the polyvinyl acetate was 95% hydrolyzed, and the solution contained about 9% solids, 15% acetic acid, and 3% sulphuric acid.

1000 parts by weight of this solution were diluted with 550 parts of water to give a solution containing about 6% solids and cooled to 0° C. in a vessel equipped with a fast propeller type agitator. 155 parts of butyraldehyde also cooled to 0° C. were added and the mixture was stirred rapidly. In a few minutes precipitation of the partially acetalized resin in very fine particles occurred, accompanied by a marked decrease in the consistency. The reaction was allowed to continue for one hour at 0° C. The mixture was then heated to 25° C. and held at that temperature while stirring, for a further two hours. The fine sticky grains of polyvinyl butyral were then washed as follows. With continuous stirring, 800 parts of liquid were removed by suction through a filter and 800 parts of water at 25° C. were added to the slurry. The slurry was stirred for ten minutes and 800 parts of liquid were removed and replaced by 800 parts of water at 25° C. After stirring for ten minutes, the resin was drained completely and washed three times with water at 60° C. draining thoroughly each time.

The polyvinyl butyral was stabilized by treatment in 0.01 N potassium hydroxide solution for four hours at 90° C. with stirring at a concentration of 10 parts of wet resin to 100 parts of the potassium hydroxide solution. The resin was separated by filtration, quickly washed once with water at 25° C. and dried in a current of air at 50° C.

The resin had the following composition:

| | Percent |
|---|---|
| Polyvinyl acetate | 7.1 |
| Polyvinyl alcohol | 18.6 |
| Polyvinyl butyral (by difference) | 74.3 |

The colour of a disc ⅛" thick pressed from this resin was 0.3 red, 0.7 yellow, as measured by reflected light in a Lovibond tintometer. The colour of a similar disc pressed from a sample of this resin heated for one hour at 150° C. in a current of air was 0.3 red, 0.7 yellow. The grain size of the polyvinyl butyral was from about 16 to about 40 mesh and the grains had an apparent density of about 0.2 g./cc. The apparent density of a commercial sample of a polyvinyl butyral made by a "solvent" process, used for safety glass was about 0.3 g./cc. The relative viscosity of the polyvinyl butyral, measured in a 2% solution in methanol, was essentially the same as that of a polyvinyl butyral made by conventional methods from a polyvinyl acetate of the same viscosity.

DISCUSSION OF EXAMPLE 1

It will be understood that the conditions employed in this example are specific and directed towards achieving a particular result in terms of the final polyvinyl butyral. These conditions may be varied in many ways to produce polyvinyl butyrals of different compositions and of varying quality, as will be well understood by those skilled in the art. As a further guide to permissible variations and conditions, the most important ones will be discussed in the following paragraphs. It will also be understood that many of the conditions are applicable to the production of polyvinyl acetals other than polyvinyl butyral so that the following discussion will serve to indicate common conditions as well as those applicable only to polyvinyl butyral. The discussion of the other examples and the general discussion at the end of the specification will serve to indicate exceptional factors which must be borne in mind when producing other polyvinyl acetals.

*Polymerization*

The emulsifying or dispersing agent employed in the starting emulsion may be a partial hydroylsis product of polyvinyl acetate or any other hydrophilic synthetic colloid capable of being converted into the acetal being produced. Suitable polyvinyl acetate emulsions are described in Patent No. 2,398,344.

*Hydrolysis*

Slow and powerful stirring is required during the hydrolysis due to the high viscosity of the solution of hydrolysis product.

The upper limit of viscosity of the polyvinyl acetate used is dictated principally by the difficulty of stirring the solution of hydrolysis product. For acetal production, however, the viscosity of the polyvinyl acetate should be high enough to avoid sticking during acetalization, preferably above about 20 centipoises (1 molar in benzene at 20° C.).

Various reaction temperatures may be used, but from about 40° C. to about 70° C. gives a reasonably fast reaction rate combined with low colour of product. If a temperature below 70° C. is used, the times of reaction in the above example must be lengthened correspondingly.

The function of the acetic acid is to swell the particles of polyvinyl acetate and thus permit a greater initial rate of hydrolysis. The addition of acetic acid is not essential since the acetic acid formed by hydrolysis of part of the polyvinyl acetate serves to swell the remainder; but under these conditions the time of reaction is much longer, for example a hydrolysis reaction in which the conditions were otherwise the same as in Example 1 except that no acetic acid was employed, required four days at 60° C. to proceed to the transparent stage, and a further 15 hours after dilution for the polyvinyl acetate to become 95% hydrolyzed. Due to minor undefined differences between emulsions, coagulation occurs in some cases at varying times after the addition of the acetic and sulphuric acids; while in other cases the reaction proceeds smoothly without coagulation at any stage. In general, the tendency to coagulate is greatly reduced by adding the diluted sulphuric acid after the acetic acid, usually a delay of one hour is adequate to prevent coagulation. In a cyclic process (Example 5) the swelling action is accomplished by combining with fresh emulsion part of a previously prepared solution of hydrolysis product, which contains the acetic acid formed by hydrolysis. This avoids the addition of any acetic acid except that produced by the reaction; and the tendency to coagulate is reduced or eliminated. It should be noted that the acetic acid produced by hydrolysis, together with that added, is available for easy recovery as acetic acid in the various liquors from the washing step; whereas in processes using alcohols as solvents the acetic acid is converted largely or entirely into acetic esters in which form it is less valuable.

In place of the aqueous emulsion of polyvinyl acetate it is possible to use an aqueous dispersion of polyvinyl acetate in the form of fine beads, thin flakes, or powder, preferably below 16 mesh. Due to the smaller surface exposed, the reaction is much slower. It is preferable to use at first only part of the polyvinyl acetate and to add the remainder after the original polyvinyl acetate has partially hydrolyzed. This is particularly true with low viscosity polyvinyl acetate which softens and tends to stick. These difficulties with beads, flakes, or powder largely disappear when using the recycling method of Example 5.

It is also desirable to add the acetic and sulphuric acids consecutively thereby causing a smoother break of the emulsion than when the acids are added simultaneously, but this on the other hand causes formation of more colour due to local reaction. The transparency point marking the end of the first stage in the hydrolysis indicates an acetate content sufficiently low to allow solubility of the resin in the acetic acid-water mixture, but insufficiently low to allow solubility in the water alone. Addition of water at this point brings the molar concentration of water to a value that will shift the hydrolysis equilibrium to the desired value, usually about 95% hydrolysis.

Strong mineral acids such as hydrochloric or sulphuric are necessary as catalysts for hydrolysis to give a sufficiently rapid reaction rate. Sulphuric acid is preferred because the acetal produced has, after stabilization, great stability with respect to viscosity. The concentration of catalyst acid should be that effective to bring the reaction time within desired limits, but insufficient to cause undesirable colour in the product. During that part of the hydrolysis before dilution, the operative range for sulphuric acid is from about 0.8% to about 16% by weight on the total charge and a preferred range is from about 5% to about 9%.

A low colour of product is favoured by low temperatures of reaction, low concentration of catalyst acid, slow addition of catalyst acid, and the use of c. p. sulphuric acid and B. P. grade acetic acid or preferably, in a cyclic process, the acetic acid formed by hydrolysis of the polyvinyl acetate.

Acetalization

The stirring must be very vigorous, for example, 8 gal. of slurry are sufficiently stirred by a 3 inch, 3-bladed propeller mounted at an angle and driven at 1725 R. P. M. The first part of the acetalization reaction must be carried out at a temperature low enough to cause the formation of very fine particles, and to prevent the particles from sticking into large lumps. A certain amount of coalescence of the fine particles does occur, and results in a finished grain which is very light and porous due to its composite nature. It is prefered to operate close to 0° C. for the first hour, but this temperature may range upward to about 15° C. After about one hour at about 0° C. the grains are less sticky, and the temperature may be raised to about 25° C. or to about 45° C. or even, for instance, under conditions of lower aldehyde concentration, to about 65° C. The dilution of the solution before acetalization is preferred since it reduces the danger of the grains sticking in large lumps. For reasons of economy the higher the concentration of solids the better, but at concentrations above about 7.5% a very high order of stirring is required, which becomes difficult on a large scale. At concentrations below about 3%, the size of the kettle becomes large in relation to the amount of resin produced. For these reasons, we prefer to operate at concentrations of from about 4% to about 6.5% solids.

The mineral acid catalyst present in the solution as prepared in Example 1 is sufficient for the acetalization in most cases. The operative range for sulphuric acid is from about 0.15% to about 7% by weight on the total charge, and a preferred range is from about 1% to about 4% by weight on the total charge. Sulphuric acid is preferred to hydrochloric since the viscosity of the resin produced is approximately the same as that of the resin made from the same polyvinyl acetate by conventional commercial processes and after stabilization the sulphuric-made resin possesses greater viscosity stability when heated than the hydrochloric-made resin.

To prevent sticking, the viscosity of the original polyvinyl acetate should be about 20 centipoises (1 molar in benzene at 20° C.) or higher. A preferred viscosity of original polyvinyl acetate for making polyvinyl butyral for safety glass is from about 50 to about 55 centipoises.

A low colour of product is obtained by starting with low coloured partially hydrolyzed polyvinyl acetate solution prepared in aqueous medium as described, and by using low catalyst acid concentrations, and low temperatures of reaction. Concentrations of resin and of alkali as given above for the stabilization give substantially maximum stability and substantially lowest colour of resin.

The amount of aldehyde may vary widely depending on reaction times and temperatures and the acetal compositions desired. In most cases, acetalization to such an extent that the resin contains only about 12% to about 20% polyvinyl alcohol is brought about in a reasonable time using from about 50 parts to about 220 parts by weight of butyraldehyde per 100 parts of the hydrolysis product on the dry basis.

The amount of residual polyvinyl acetate can be varied by the degree of hydrolysis permitted in the hydrolysis reaction. A very slight further hydrolysis occurs in the acetalization step.

The degree of acetalization may be varied by varying the temperature of reaction, concentration of catalyst acid and of aldehyde, and time of reaction. It has been possible in accordance with the procedure of the above example to make polyvinyl butyral having between about 9% and about 30% residual polyvinyl alcohol, by changing the time of reaction. Those resins having a residual polyvinyl alcohol content of about 16% or higher, preferably from about 16% to about 22% have the unusual characteristic that they have a porous structure and are capable of being readily stabilized, in the absence of organic solvents often employed hitherto in the stabilizing liquor to act as swelling agents, to give an end product which is stable as to colour and viscosity. As the residual polyvinyl alcohol content is reduced below about 16%, by changing the reaction conditions, stabilization by the method described tends to become less effective.

Washing

The resin should be thoroughly washed, which is prefe ably accomplished by removing a portion of the liquid, adding water at a temperature from about 10° C. to about 50° C., draining the resin completely and washing it repeatedly with water at from about 30° C. to about 70° C. and then draining the resin completely again.

Stabilization

The alkali concentration during stabilization should be between 0.05 N and 0.005 N preferably at about 0.01 N. Either sodium or potassium hydroxide may be used. A relatively high temperature, i. e. from about 70° C. to about 95° C. is preferable, since at this temperature the water-soaked grain is soft and allows good penetration by the alkali. The time of treatment may be varied between about two hours and four hours, depending on the degree of stability desired. The concentration of the resin in the stabilization slurry should be low enough to avoid too great an exhaustion of the alkali during stabilization. A preferred concentration is about 10 parts by weight of wet resin to about 100 parts by weight of alkali solution. The stirring during stabilization should be sufficient to keep the resin grains up from the bottom of the vessel. The resin is preferably separated by filtration and quickly washed, usually once, with water at from about 10° C. to about 30° C. and then dried, desirably in a current of air, at from about 20° C. to about 70° C.

Example 2

Preparation of a polyvinyl butyral 1000 parts of aqueous polyvinyl acetate emulsion as described in Example 1 were heated to 40° C. while stirring slowly, and a mixture consisting of 125 parts of water, 131 parts of B. P. grade acetic acid, and 110 parts of c. p. sulphuric acid, was added during one hour. The opaque mixture was stirred slowly at 40° C. until it became transparent. This occurred 24 hours after the addition of the water, acetic acid, and sulphuric acid. 2000 parts of water were then added during three hours. The reaction was allowed to continue at 40° C. with stirring for a further 48 hours, at the end of which time the polyvinyl acetate was 95% hydrolyzed, and the solution contained about 9% solids, 15% acetic acid, and 3% sulphuric acid.

1000 parts by weight of this solution were diluted with 550 parts of water to give a solution containing about 6% solids and cooled to 0° C. in a vessel equipped with a fast propeller type agitator. 155 parts of butyraldehyde, also cooled to 0° C. were added and the subsequent reaction, washing and stabilization were carried out as described in Example 1.

The polyvinyl butyral produced had the following composition:

| | Per cent |
|---|---|
| Polyvinyl acetate | 6.4 |
| Polyvinyl alcohol | 19.2 |
| Polyvinyl butyral (by difference) | 74.4 |

The colour of a disc ⅛" thick pressed from this resin was 0.3 red, 0.6 yellow, as measured by reflected light in a Lovibond tintometer. The colour of a similar disc pressed from a sample of this resin which had been heated for one hour at 150° C. in a current of air was 0.3 red, 0.6 yellow. The grain size and relative viscosity of this material was of the same order as that of the resin produced in Example 1.

EXAMPLE 3

*Preparation of polyvinyl butyral*

1000 parts by weight of a solution of partially hydrolyzed polyvinyl acetate, prepared as described in Example 1, were diluted with 550 parts of water to give a solution containing about 6% solids, and cooled to 0° C. in a vessel equipped with a fast propeller type agitator. 58 parts of butyraldehyde also cooled to 0° C. were added with rapid stirring. In about 20 minutes, precipitation of the partially acetalized resin in very fine particles occurred, accompanied by a marked decrease in the consistency. The reaction was allowed to proceed for a further 40 minutes at 0° C., then the mixture was heated to 25° C. and allowed to react at this temperature for a further period of 24 hours with continued stirring.

The resin was washed and stabilized as described in Example 1, and the composition was as follows:

| | Per cent |
|---|---|
| Polyvinyl acetate | 6.3 |
| Polyvinyl alcohol | 20.9 |
| Polyvinyl butyral (by difference) | 72.8 |

The colour of a disc ⅛" thick pressed from this resin was 0.5 red, 0.9 yellow, as measured by reflected light in a Lovibond tintometer. The colour of a similar disc pressed from a sample of this resin which had been heated for one hour at 150° C. in a current of air was 0.5 red, 1.0 yellow.

EXAMPLE 4

*Preparation of polyvinyl butyral*

1000 part of aqueous polyvinyl acetate emulsion as described in Example 1 were heated to 40° C. and a mixture consisting of 202 parts of water, 173 parts of B. P. grade acetic acid, and 110 parts of c. p. sulphuric acid, was added during one hour. After 48 hours at 40° C. with slow stirring, the reaction had proceeded to 75% with hydrolysis. The solution was very viscous and contained about 23% solids, 31% acetic acid and 7% sulphuric acid.

1000 parts of this solution were diluted with a mixture of 4730 parts of water and 40 parts of c. p. sulphuric acid and cooled to 0° C. in a vessel equipped with a fast propeller type agitator. 474 parts of butyraldehyde, also cooled to 0° C. were added and the mixture was stirred rapidly. The reaction was carried out for one hour at 0° C. and 2½ hours at 25° C. Washing and stabilization were carried out as in Example 2.

The polyvinyl butyral produced had the following composition:

| | Per cent |
|---|---|
| Polyvinyl acetate | 26.3 |
| Polyvinyl alcohol | 19.3 |
| Polyvinyl butyral (by difference) | 54.4 |

The color and stability of this resin were the same as that prepared in Example 2.

DISCUSSION

Due to hydrolysis there is a drop during the acetalization of about 5% in the amount of polyvinyl acetate. A slightly longer time of acetalization is needed in this process to bring the polyvinyl butyral to the same polyvinyl alcohol content as that given in Example 1.

EXAMPLE 5

*Polyvinyl butyral by a cyclic process*

For the initial run of the series, the initial materials used and their quantities were the same as in Example 1. Hydrolysis was allowed to proceed for 24 hours at 40° C. and the resulting solution of partially hydrolyzed polyvinyl acetate, acetic acid, and water was divided. 911 parts (two-thirds) of this solution were diluted with 1333 parts of water and were allowed to hydrolyze further for 48 hours at 40° C. This portion was acetalized with butyraldehyde and the resulting polyvinyl butyral washed and stabilized as in Example 1. To the remaining third containing acetic acid generated in the initial stage of the hydrolysis were added 667 parts of fresh polyvinyl acetate emulsion and a mixture of 73 parts of c. p. sulphuric acid and 171 parts of water. Hydrolysis was allowed to proceed for 24 hours at 40° C. and the resulting solution was again divided, two-thirds being hydrolyzed further and acetalized, one-third being recycled as above. This cycle can be repeated indefinitely.

DISCUSSION

This process avoids the addition of any fresh acetic acid after the initial run of the series. The recycled portion of the solution of partially hydrolyzed product contains sufficient acetic acid, produced by hydrolysis of the polyvinyl acetate emulsion, to soften the fresh polyvinyl acetate emulsion and allow rapid hydrolysis. Calculations show that the effect of the added acetic acid in the initial run has become negligible by the end of the 5th cycle. The acetic acid carried through from the hydrolysis step is recoverable as such in the washing step. The polyvinyl butyral produced by this process was the same as that produced by the process given in Example 2.

Instead of using polyvinyl acetate emulsion one may use polyvinyl acetate in the form of fine beads, thin flakes, or powder, preferably below 16 mesh, with the amount of water corresponding to that used in the emulsion of the example.

When using the recycling process of this example, there is no tendency for the emulsion to coagulate during hydrolysis as described in Example 1 and it is not necessary to postpone the addition of the sulphuric acid until after the addition of the acetic acid.

EXAMPLE 6

Preparation of polyvinyl benzaldehyde acetal 1000 parts of a solution of partially hydrolyzed polyvinyl acetate as described in Example 1 were diluted with 550 parts of water and cooled to 0° C. in a vessel equipped with a fast propeller type stirrer. 115 parts of benzaldehyde also cooled to 0° C. were added and the mixture was stirred rapidly. After one hour the reaction mixture was warmed to 35° C. and reaction was allowed to continue for 24 hours. The polyvinyl benzal resin was then separated, washed and stabilized as in Example 1. Discs ⅛" thick pressed from the stabilized resin had a colour of 0.8 red, 2.5 yellow measured as before. Similar discs pressed from stabilized resin having been heated to 150° C. for 1 hour in a current of air had a colour of 1.0 red, 4.0 yellow. The resin was tough and had a high softening point.

The polyvinyl benzal produced had the following composition:

|   | Per cent |
|---|---|
| Polyvinyl acetate | 7.3 |
| Polyvinyl alcohol | 22.1 |
| Polyvinyl benzal (by difference) | 70.6 |

DISCUSSION

After the first hour at about 35° C. the rate of stirring may be reduced without danger of the grains sticking. The initial stage of the acetalization is carried out between about 0° C. and about 15° C. The temperature is raised to from about 35° C. to about 65° C. for the subsequent stage of the reaction.

EXAMPLE 7

Preparation of a co-acetal of acetaldehyde and butyraldehyde 1000 parts of a solution of partially hydrolyzed polyvinyl acetate as described in Example 1 were diluted with 550 parts of water containing 17 parts of c. p. sulphuric acid and heated to 35° C. in a vessel equipped with a fast propeller type stirrer. 96 parts of paraldehyde were added and the mixture was stirred rapidly. After 50 minutes, the resin was in state of incipient precipitation, and the mixture was cooled to 15° C. during 15 minutes. At this time 78 parts of butyraldehyde were added with continued stirring. In about one minute the resin had precipitated in very fine particles and the reaction was allowed to proceed for one hour at 15° C. After one hour the temperature was raised to 25° C. and held for two hours. The co-acetal was then separated, washed, and stabilized as in Example 1. The disc colours of this resin were 0.3 red, 0.8 yellow unheated and 0.5 red and 1.7 yellow after heating as in Example 1.

The co-acetal had the following composition:

| Polyvinyl acetate | per cent | 5.1 |
|---|---|---|
| Polyvinyl alcohol | do | 17.7 |
| Molar ratio Acetaldehyde/butyraldehyde |  | 63:37 |

DISCUSSION

The residual polyvinyl alcohol content of the resin can be lowered by longer time of reaction, but the degree of stability is thereby decreased. If desired, the resin can be precipitated with the first aldehyde alone, and further acetalization carried out with the second aldehyde. The ratio of aldehydes combined may be varied over any desired limits, but corresponding changes in the temperatures of precipitation and subsequent reaction conditions may be required. The conditions of the acetal reaction are substantially the same as those employed for polyvinyl butyral except that the temperature will follow that required for the particular aldehyde used in the initial stage or if both aldehydes are added at once the initial stage will be conducted at a temperature less than about 15° C. The total concentration of aldehydes is about equivalent to that used in the other examples.

EXAMPLE 8

Preparation of polyvinyl acetaldehyde acetal 1000 parts of a solution of partially hydrolyzed polyvinyl acetate as described in Example 1 were diluted with a mixture of 960 parts of water and 53 parts of c. p. sulphuric acid, and heated to 35° C. in a vessel equipped with a fast propeller type stirrer. 145 parts of paraldehyde were added and the mixture was stirred rapidly. The reaction was allowed to continue for 6 hours at this temperature. The acetaldehyde acetal grains were then separated, washed and stabilized as in Example 1 except that 0.005 N potassium hydroxide solution was used in place of 0.01 N. Discs ⅛" thick pressed from the stabilized resin had a colour of 0.9 red, 1.5 yellow, measured as before. Discs pressed from samples of resin having been heated to 150° C. for one hour in a current of air had a colour of 0.7 red, 1.8 yellow.

The composition of the polyvinyl acetal resin produced was as follows:

|   | Per cent |
|---|---|
| Polyvinyl acetate | 6.4 |
| Polyvinyl alcohol | 18.4 |
| Polyvinyl acetal (by difference) | 75.2 |

DISCUSSION

Since the rate of acetalization with acetaldehyde is comparatively slow, sulphuric acid catalyst concentrations from about 2% to about 5% are used and a temperature from about 30° C. to about 45° C. employed to increase the rate of reaction. The amount of aldehyde and sulphuric acid may be reduced if the time of reaction is not important.

EXAMPLE 9

Preparation of polyvinyl butyral using hydrochloric acid as catalyst 1000 parts of an aqueous polyvinylacetate emulsion similar to that described in Example 1 were heated to 70° C. while stirring slowly and a mixture consisting of 60 parts of water, 131 parts of B. P. grade acetic acid, and 108 parts of 36% hydrochloric acid, was added during one hour. After four hours at 70° C., with slow stirring, the reaction mixture became transparent and 2000 parts of water were added during one hour. The reaction was allowed to continue at 70° C. for eight hours, at the end of which time the polyvinyl acetate was about 95% hydrolyzed and the solution contained about 9% solids, 15% acetic acid, and 3% of 36% hydrochloric acid.

The acetalization, washing, stabilization, and drying were carried out as described in Example 1.

The polyvinyl butyral produced had the following composition:

|   | Percent |
|---|---|
| Polyvinyl acetate | 6.4 |
| Polyvinyl alcohol | 18.7 |
| Polyvinyl butyral (by difference) | 74.9 |

The colour of the resin was substantially the same as that produced in Example 1 for both unheated and heated samples. Although this resin was given the stabilization treatment which was effective with resins made with sulphuric acid, the viscosity was abnormally high, and showed an unusually large drop on heating for one hour at 150° C.

DISCUSSION

Hydrolysis

The composition of the hydrolysis product was essentially the same as in Example 1. In general the discussion of the various factors given under Example 1 applies also to this example, with the modifications in equipment required to resist the corrosive action of hydrochloric acid.

Acetalization

The polyvinyl butyral produced in the above example, although identical in analysis and appearance, nevertheless had viscosity and stability characteristics widely differing from that of Example 1. The following table illustrates the differences in behaviour between these resins. The heated samples were those heated for one hour at 150° C. in a current of air. The relative viscosities are those of 2% solutions in methanol.

[Relative viscosity (2% in MeOH)]

| Ex. | Catalyst | Unstabilized | | Stabilized | |
|---|---|---|---|---|---|
| | | Unheated | Heated | Unheated | Heated |
| 1 | Sulphuric Acid | 7.0 | Brown to black and insoluble | 7.0 | 6.0 |
| 9 | Hydrochloric Acid | 20.0 | 4.0 | 20.0 | 2.6 |

Polyvinyl butyral made by the customary alcoholic solvent process has a relative viscosity of the same order of magnitude as that of the resin produced using sulphuric acid as in Example 1. The resin produced by Example 9 has a viscosity which is unusually high, and suffers considerable degradation on heating without going insoluble and is not stabilizable by ordinary procedures, using alkali and/or para-tertiary amyl phenol.

The difference in relative viscosity between the resins made with hydrochloric acid and those made with sulphuric acid increases as the viscosity of the original polyvinyl acetate increases. This difference was found to be about 200% at V. 25 and 300–400% at V. 50–55.

The polyvinyl butyrals produced by using hydrochloric acid as the catalyst are characterized by having initial viscosities of a different order from those made by conventional methods or made by the sulphuric acid method described herein. Their high initial viscosity, their different behaviour on stabilizing, their color-stability and viscosity-instability on heating characterize them as different polyvinyl acetal resin bodies.

EXAMPLE 10

Preparation of a polyvinyl butyral 1000 parts by weight of a solution of partially hydrolyzed polyvinyl acetate, prepared as described in Example 1, were diluted with 550 parts of water containing 0.8 parts of gelatine, to give a solution containing about 6% solids, and cooled to 15° C. in a vessel equipped with a fast propeller-type agitator. 55 parts of butyraldehyde were added with rapid stirring. In about three minutes precipitation of the partially acetalized resin in very fine particles occurred. The reaction was allowed to proceed for a further sixty minutes at 15° C., and the mixture was then heated to 65° C. during a period of 1½ hours, and allowed to react at that temperature for a further two hours.

The resin was washed and stabilized as described in Example 1 and the composition was as follows:

| | Percent |
|---|---|
| Polyvinyl acetate | 6.0 |
| Polyvinyl alcohol | 18.8 |
| Polyvinyl butyral (by difference) | 75.2 |

The colour of a disc ⅛" thick pressed from this resin was 0.3 red, 0.7 yellow as measured by reflected light in a Lovibond tintometer. The colour of a similar disc pressed from a sample of this resin which had been heated for one hour at 150° C. in a current of air was 0.3 red, 0.7 yellow.

DISCUSSION

This example demostrates the preparation of a polyvinyl butyral, where a suitable dispersing agent is employed in the acetalization step, and the stabilization of the butyral by the aqueous methods of the present invention.

In order to obtain a low colored resin, when a dispersing agent is used, this agent must neither contain nor decompose to give colour forming substances under the conditions of the acetalization reaction. Gelatin in amounts from about 0.2% to about 1.0% by weight on the hydrolysis product has been found to be satisfactory in this respect, while others, as for example Duponol ME (chiefly sodium lauryl sulphate) cause the formation of undesirable colour and decrease the stability of the resin.

The temperature may be varied, for instance, the primary step of the acetal reaction may be carried out at a temperature below about 30° C., preferably between about 15° C. and about 25° C., while an intermediate polyvinyl acetal resin is precipitated in finely divided form, and then the temperature raised if desired, to above about 50° C., preferably keeping it below about 65° C., until the reaction has proceeded to the desired end point. Effective agitation should be continued throughout the procedure. The dispersing agent is normally present at the start of the acetal reaction, but can be added at a later stage. The amount of hydrolysis product present in the acetalization step may be somewhat above the preferred ranges set out for the procedure in which there is no dispersing agent for instance, the amount of hydrolysis product present at the beginning of the acetalization step may range up to about 10% by weight.

GENERAL DISCUSSION

The foregoing examples and the discussions thereof are representative of the production of polyvinyl acetal resins according to the present invention. Various modifications can be made within the scope of the invention, and it will be apparent, as already mentioned, that much of the discussion applies in a general way to the production of acetals other than those specifically discussed. Among the principal modifications are the following.

Starting materials

There may be used as a starting material any polyvinyl ester which in the reaction gives an acid which is removable by washing, has the necessary solubility in water and is recoverable. The preferred polyvinyl ester is polyvinyl acetate.

Where, according to the invention, a process is employed involving polymerization followed by hydrolysis and acetalization in the absence of extraneous solvents, it is important that the proper emulsifying agents be employed during polymerization. Where the preferred acetalization step is employed as outlined herein and no dispersing agent is used therein, we prefer to use as emulsifying agents bodies capable of reacting with the aldehyde to form an acetal, such as for instance, synthetic colloids like partial hydrolysis products of polyvinyl acetate including water soluble polyvinyl acetals.

Hydrolysis products

While the hydrolysis products disclosed herein are preferred as starting materials for the acetalization step, other hydrolysis products may be employed, for instance, those resulting from the acid hydrolysis of polyvinyl esters in organic solvents.

Aldehydes

The various aldehydes, either alone or in combination known in the art for the production of polyvinyl acetal resins may be employed, provided they contain two or more carbon atoms in the molecule. Suitable aldehydes are acetaldehyde, propionaldehyde, butyraldehyde, benzaldehyde, and the like. By far the preferred aldehyde is butyraldehyde with which unusually good results are achieved, and it should also be noted, that the conditions involved in the formation of a particular polyvinyl acetal by the aqueous methods described herein and the formation of other polyvinyl acetals vary very significantly in a specific sense. The molar concentration of aldehyde which should be used is similar to that for butyraldehyde.

Catalyst

The various catalyst acids well known in the art for the manufacture of polyvinyl acetal resins are employable. We prefer to use mineral acids, particularly sulphuric acid and hydrochloric acid, especially the former which provides results which in certain respects are unexpectedly superior to those achieved by using the latter.

Where an acid is added to start the hydrolysis, the acid should be that corresponding to the polyvinyl ester.

Stabilization

We have discovered that the stabilizing procedure described herein is only effective, for producing resins with low colour and high stability, when applied to resins in the porous condition resulting from the preferred aqueous method of acetalization, in the absence of dispersing agents, disclosed herein, or from aqueous methods in which particular dispersing agents are employed, which have no deleterious effect on the resulting product. The nature of the starting hydrolysis product is also important in obtaining low coloured and stable resins.

Acetal resins prepared by this invention and containing 10% to 25% by weight of polyvinyl alcohol are stabilizable by the method described. In particular, butyral resins made by the invention and containing 16% to 22% polyvinyl alcohol have, when stabilized by the method described, extremely low colour and good stability with respect to colour and viscosity.

Conditions

The concentrations and conditions follow generally from the discussion of the specific examples and the previous description so that it is not necessary to elaborate further upon these factors. An important factor is the adjustment of concentrations of constituents, temperatures, etc. in the acetalization step in order to prevent the grains sticking together undesirably, as discussed in more detail in connection with Example 1. Where a partially hydrolyzed polyvinyl acetate low in acetate content is used as the starting material for the acetalization step, it will be understood that the polyvinyl acetate content of the resin produced will be lower than that of resins produced by the procedure described.

Advantages

The various advantages provided by the invention will be evident to one skilled in the art.

It will be understood that, without departing from the spirit of the invention or the scope of the claim, various modifications may be made in the specific expedients described. The latter are illustrative only and not offered in a restricting sense, it being desired that only such limitations shall be placed thereon as may be required by the state of the prior art.

The sub-titles used throughout the specification are merely to simplify reference thereto and should otherwise be disregarded.

We claim:

A process of preparing a polyvinyl acetal resin having a residual polyvinyl alcohol content from 9% to 30% by weight which consists in polymerizing vinyl acetate in aqueous dispersion in the presence of a water soluble partial hydrolysis product of polyvinyl acetate thereby to form an aqueous dispersion of polyvinyl acetate having a viscosity above 20 centipoises determined at 20° C. in a molar solution in benzene and containing said hydrolysis product as a dispersing agent, hydrolyzing said last aqueous dispersion in the presence of a mineral acid catalyst at a temperature within the range from 40° C. to 70° C. to form an aqueous solution of partially hydrolyzed polyvinyl acetate hydrolyzed to at least 75%, diluting said solution to form an aqueous solution containing from 3% to 7.5% of such partially hydrolyzed polyvinyl acetate, adding to said solution from 1% to 4% of sulphuric acid by weight, adding to said last-mentioned solution an aldehyde selected from the group consisting of butyraldehyde, benzaldehyde and a mixture of butyraldehyde and acetaldehyde while maintaining the reaction mixture at a temperature within the range from 0° C. to 15° C., the amount of aldehyde added being within the range from 50 to 220 parts by weight per 100 parts of partially hydrolyzed polyvinyl acetate, reacting the aldehyde with the hydrolysis product while maintaining the temperature within the range from 0° C. to 15° C. under vigorous agitation thereby to cause precipitation of partially acetalized resin as fine particles and continuing the agitation until such particles assume a condition wherein they will not, on being heated, agglomerate into a mass while such agitation is continued, then heating the charge to a temperature of 25° C. to 65° C., while continuing agitation and causing the reaction to proceed until a polyvinyl acetal resin is formed containing between 9% and 30% residual polyvinyl alcohol, washing the resin to remove acid, and stabilizing said resin by subjecting it at an elevated temperature to the action of a solution consisting of water and an alkaline substance selected from the group consisting of sodium hydroxide and potassium hydroxide.

GEORGE OSMAN MORRISON.
FREDERICK PETTIT LOSSING.
ALBERT HAROLD HEATLEY.
JOSEPH FREDERIC LEO
MARCEL GERMAIN.

REFERENCES CITED

The following references are of record in the file of this patent:

UNITED STATES PATENTS

| Number | Name | Date |
|---|---|---|
| 2,179,051 | Morrison | Nov. 7, 1939 |
| 2,282,026 | Bren | May 5, 1942 |
| 2,345,946 | Overbaugh | April 4, 1944 |

FOREIGN PATENTS

| Number | Country | Date |
|---|---|---|
| 813,303 | France | Feb. 22, 1937 |
| 849,460 | France | August 21, 1939 |